United States Patent
Lee et al.

(10) Patent No.: US 7,161,649 B2
(45) Date of Patent: Jan. 9, 2007

(54) METHOD FOR ALIGNING POLARIZER AND RUBBING AXES IN A FRINGE FIELD SWITCHING LIQUID CRYSTAL DISPLAY DEVICE

(75) Inventors: Kyung Ha Lee, Kyoungki-do (KR); Kwi Hyun Kim, Kyoungki-do (KR)

(73) Assignee: Boe Hydis Technology Co., Ltd., Kyoungki-do (KR)

( * ) Notice: Subject to any disclaimer, the term of this patent is extended or adjusted under 35 U.S.C. 154(b) by 87 days.

(21) Appl. No.: 10/939,760

(22) Filed: Sep. 13, 2004

(65) Prior Publication Data
US 2005/0179835 A1     Aug. 18, 2005

(30) Foreign Application Priority Data
Feb. 16, 2004   (KR) ................. 10-2004-0010117

(51) Int. Cl.
G02F 1/1343 (2006.01)
G02F 1/1335 (2006.01)
G02F 1/1337 (2006.01)

(52) U.S. Cl. ............... 349/141; 349/96; 349/126
(58) Field of Classification Search ............. 349/99, 349/126, 141
See application file for complete search history.

(56) References Cited

U.S. PATENT DOCUMENTS

| 6,256,081 B1 * | 7/2001 | Lee et al. ............... 349/141 |
| 6,466,288 B1 * | 10/2002 | Rho ............... 349/141 |
| 6,512,503 B1 * | 1/2003 | Kim et al. ............... 345/87 |
| 6,522,380 B1 * | 2/2003 | Lee et al. ............... 349/141 |
| 6,741,311 B1 * | 5/2004 | Hong et al. ............... 349/141 |
| 6,781,657 B1 * | 8/2004 | Kim et al. ............... 349/129 |
| 2002/0067448 A1 * | 6/2002 | Kim et al. ............... 349/123 |
| 2002/0067454 A1 * | 6/2002 | Hong et al. ............... 349/141 |

FOREIGN PATENT DOCUMENTS

| KR | 2001-110089 A | * 12/2001 |
| KR | 2002/0042928 | 6/2002 |
| KR | 2002-044295 A | * 6/2002 |
| KR | 2003/0003770 | 1/2003 |

* cited by examiner

Primary Examiner—Tarifur R. Chowdhury
(74) Attorney, Agent, or Firm—Ladas & Parry LLP

(57) ABSTRACT

Disclosure is a method for asymmetrically aligning polarizer and rubbing axes of a fringe field switching liquid crystal display, which removes a ghost image and a rubbing mura, caused by an electric field applied to a panel under a low gray scale and dark state, by twisting an optical axis of a polarizer plate and rubbing optical axes of upper and lower plates. The Disclosure aligns polarizer and rubbing axes of a lower plate into which polarizing light is incident in such a manner that an angle formed between the polarizer and rubbing axes is a first predetermined angle and aligns polarizer and rubbing axes of an upper plate through which the polarizing light passes via a liquid crystal in such a manner that an angle formed between the polarizer and rubbing axes is a second predetermined angle.

4 Claims, 3 Drawing Sheets rubbing direction of 0 degree

METHOD FOR ALIGNING POLARIZER AND RUBBING AXES IN A FRINGE FIELD SWITCHING LIQUID CRYSTAL DISPLAY DEVICE

BACKGROUND OF THE INVENTION

1. Field of the invention

The present invention relates to a liquid crystal display, and more particularly to a method for asymmetrically aligning polarizer and rubbing axes in order to remove a ghost image and a rubbing mura caused by an electric field applied to a panel under a low gray scale and dark state of a fringe field switching liquid crystal display.

2. Description of the Prior Art

FIG. 1 is a view showing a conventional fringe field switching liquid crystal display (FFS-LCD). FIG. 2 is a view showing a polarizer axis of the FFS-LCD shown in FIG. 1.

As shown in FIG. 1, in a conventional ultra-FFS, a second ITO electrode 104 overlaid on a first ITO electrode 102 is fabricated as an electrode having an oblique-comb shape, and a liquid crystal is aligned at an angle of 0°. Accordingly, the liquid crystal caused by an electric field is twisted in such a manner that upper and lower sides of the liquid crystal are directed opposite to each other, thereby preventing the chromatic shift of yellow color or blue color caused by dielectric anisotropy.

According to the conventional FFS-LCD having the above construction, since an overlapped region between electrodes is very wide, layers such as insulation layers may be deteriorated if the conventional FFS-LCD operates for a long period of time, causing inferior ghost images. In order to correct such a disadvantage, various shapes and structures of electrodes have been studied and proposed.

In a normally black mode of a conventional FFS, an L0 (dark and black) state is maintained when a voltage is not applied to the conventional FFS and a L255 gray scale (white) is realized because a liquid crystal is aligned in an electric field direction or a vertical direction according to an applied electric field.

Factors such as impurity within liquid crystal, an insulating layer between electrodes, and a liquid crystal-alignment layer degraded due to an electric field applied for a long time through the above-described operating principle, deteriorates quality of an image due to a ghost image and a mura in a low gray scale state.

SUMMARY OF THE INVENTION

Accordingly, the present invention has been made to solve the above-mentioned problems occurring in the prior art, and an object of the present invention is to provide a method for asymmetrically aligning polarizer and rubbing axes of a fringe field switching liquid crystal display (FFS-LCD), which is capable of removing a ghost image and a rubbing mura, caused by an electric field applied to a panel under a low gray scale and dark state, by twisting an optical axis of a polarizer plate and rubbing optical axes of upper and lower plates.

In order to accomplish this object, there is provided a method for aligning polarizer and rubbing axes in a fringe field switching liquid crystal display device, the method comprising the steps of: aligning first polarizer and rubbing axes of a lower plate, into which polarizing light is incident, in such a manner that a first predetermined angle is formed between the first polarizer and rubbing axes; and aligning second polarizer and rubbing axes of an upper plate, through which polarizing light passes via a liquid crystal, in such a manner that a second predetermined angle is formed between the second polarizer and rubbing axes.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
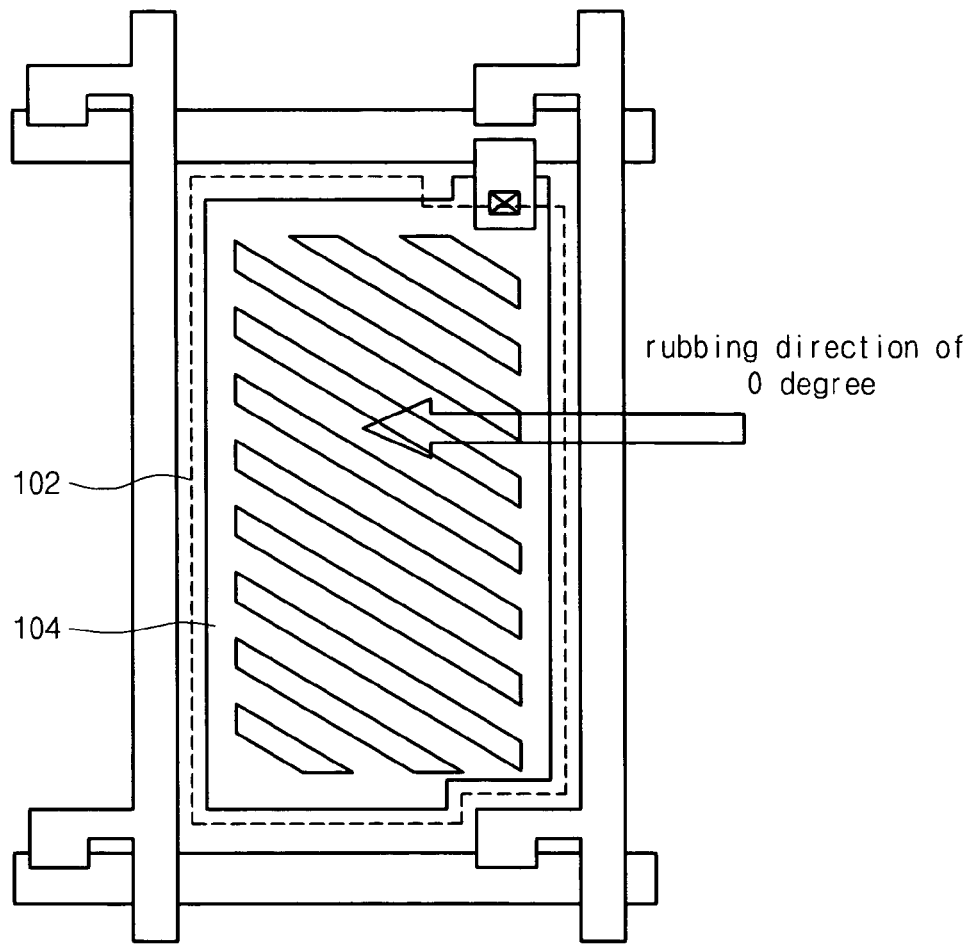
FIG. 1 is a view showing a conventional FFS-LCD.
Figure 2:
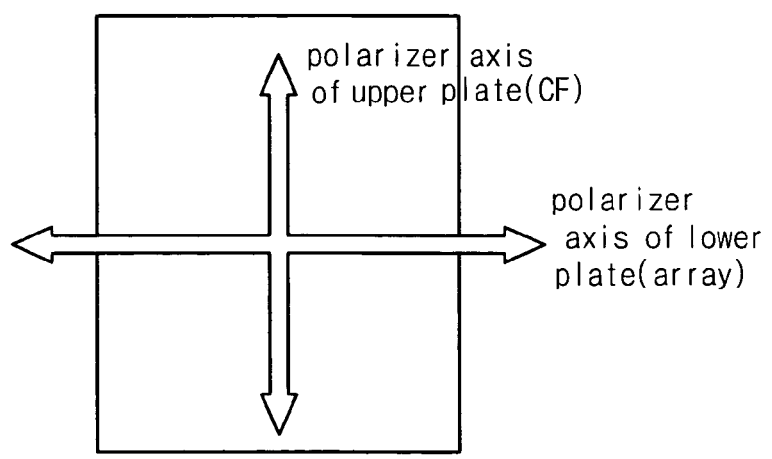
FIG. 2 is a view showing a polarizer axis of an FFS-LCD shown in FIG. 1.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 3:
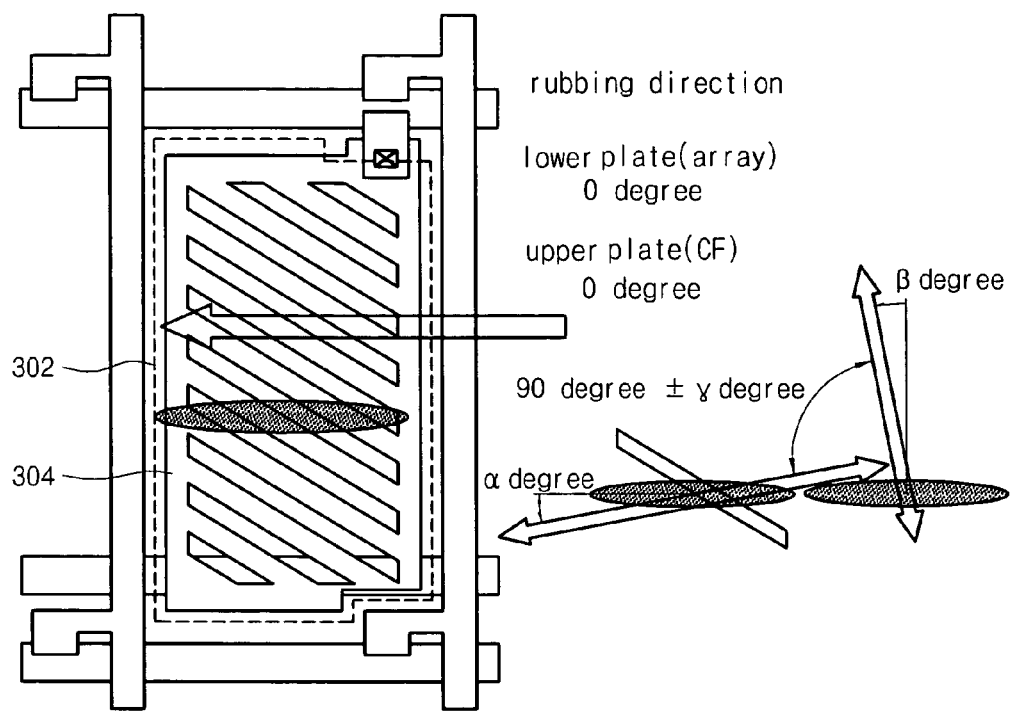
FIG. 3 is a plan view showing an FFS-LCD according to one embodiment of the presentation invention.
Figure 4:
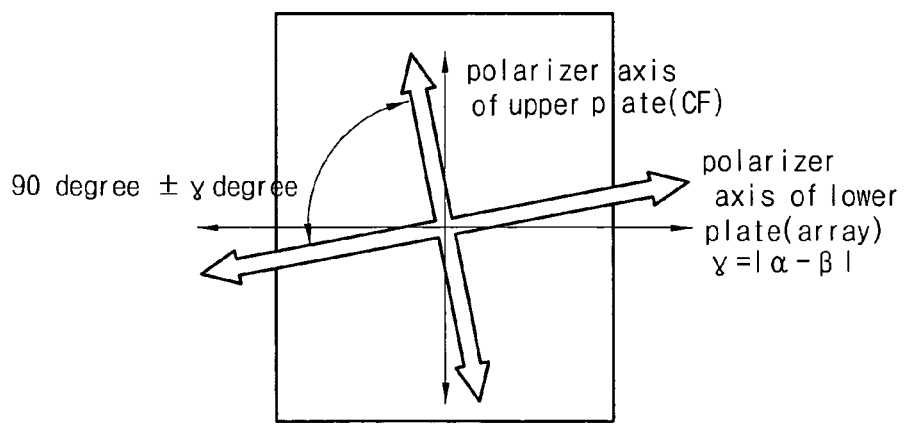
FIG. 4 is a view showing a polarizer axis of an FFS-LCD shown in FIG. 3.
Figure 5:
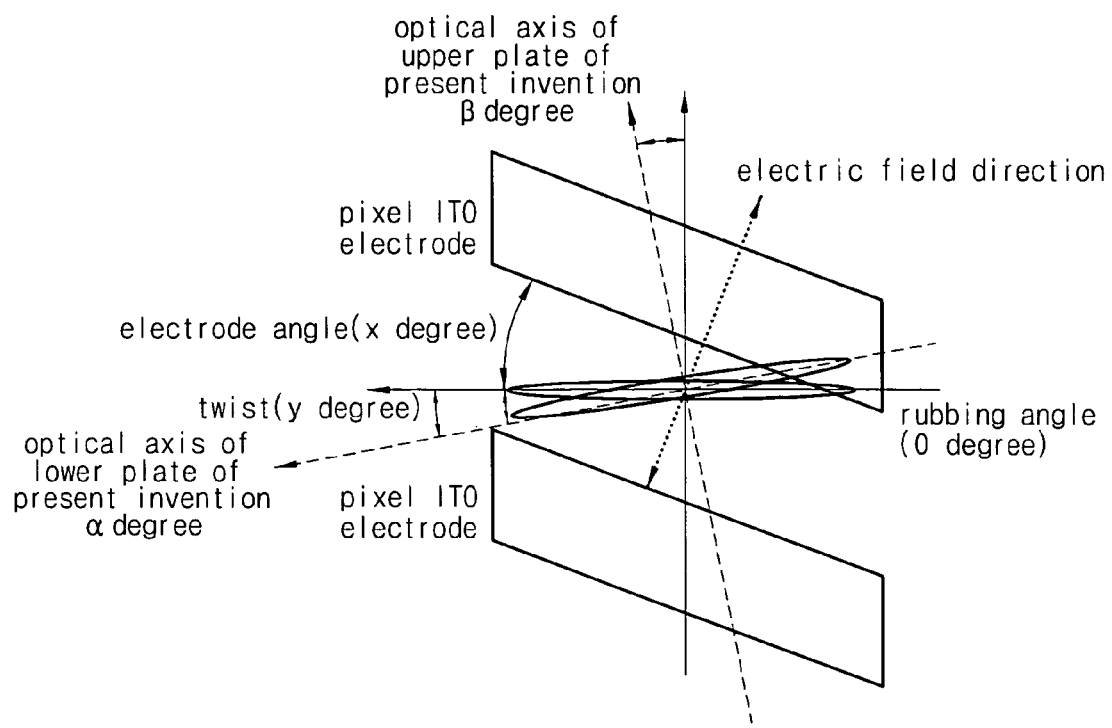
FIG. 5 is a view showing a lower plate liquid crystal alignment shape in a dark state according to one embodiment of the present invention.

FIG. 3 is a plane view showing an FFS liquid crystal display (FFS-LCD) according to one embodiment of the present invention. FIG. 4 is a view showing a polarizer axis of the FFS-LCD shown in FIG. 3. FIG. 5 is a view showing a liquid crystal alignment shape of a lower plate in a dark state according to the present invention.

When designing a current FFS cell, the rubbing and polarizer axes of upper and lower plates are designed such that they match with each other, thereby forming black and white colors. However, according to the present invention, since a little amount of mismatching fields is applied to a pixel electrode 304 in a general dark state, the polarizer and rubbing axes are asymmetrically aligned as shown in FIG. 3, thereby allowing a dark color to become more dark while significantly reducing visibility of the ghost image and a mura in a gray state. Basically, the present invention aligns polarizer and rubbing axes asymmetrically to each other by considering that light passes through a route "a polarizer axis of a lower plate→a rubbing line→a liquid crystal→a rubbing line→a polarizer axis of an upper plate" in an LCD. Reference number 302 shown in FIG. 3 represents a common electrode.

Polarizer and rubbing axes of the lower plate, into which polarizing light is incident, are aligned in such a manner that an angle formed between the polarizer and rubbing axes of the lower plate is $\alpha°$, and polarizer and rubbing axes of the upper plate, through which polarizing light passes via a liquid crystal, are aligned in such a manner that an angle formed between the polarizer and rubbing axes of the upper plate is $\beta°$. Accordingly, the polarizer and rubbing axes are asymmetrically aligned in the FFS-LCD in such a manner that an angle formed between polarizer axes of the upper and lower plates is $90°\pm|\alpha-\beta|$. That is, the polarizer and rubbing axes of the lower plate, into which polarizing light is incident, are twisted by an angle of $\alpha°$, and the polarizer and rubbing axes of the upper plate through which polarizing light passes via a liquid crystal are twisted by an angle of $\oplus°$, thereby lowering visibility of a rubbing mura and reducing disorder of a liquid crystal generated from an upper part of the rubbing line while asymmetrically aligning the polarizer and rubbing axes with respect to the each other. Herein, it is preferred that the angles of $\alpha°$ and $\beta°$ must be smaller than an angle of 90°.

As shown in FIG. 5, in a dark state (Vd~OV), that is, under the dark state of a liquid crystal alignment of the lower plate (above an array electrode), the electric field has approximately zero voltage. However, in practical, liquid crystal in the vicinity of the lower plate is twisted by an angle of $\gamma°$ due to minute leakage current/voltage. An angle formed between the polarizer axes of the upper and lower plates is changed from 90° into 90°±|α−β|.

Therefore, according to the present invention, it is possible to remove visibility caused by a ghost image and a mura in a low gray scale (<L100) incurring a problem after realizing a screen having a white color, a gray color, etc., when applying voltage for a long time in a conventional normally black mode. Also, according to the present invention, it is possible to remove a mura of line patterns caused by rubbing distortion having high visibility in a low gray scale and to improve quality of products by performing an asymmetric FFS cell designing method instead of a conventional symmetric cell designing method.

In addition, according to the present invention, the rubbing and polarizer axes are aligned asymmetrically to each other by considering variation of a liquid crystal different from the currently-produced symmetric cells, so that it is possible to remove a mura of rubbing line patterns, to remove an inferior ghost image having visibility for a long time, to improve a contrast ratio in order to prevent leakage of a rubbing part in a dark state, to provide a low gray scale image having high quality adaptable for a TV and a medical monitor using high quality black and white colors, and to obtain a sufficient process margin for mismatching of optical axes occurring when performing a polarizer attachment process.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for aligning polarizer and rubbing axes in a fringe field switching liquid crystal display device, the method comprising the steps of:
   i.) aligning first polarizer and rubbing axes of a lower plate, into which polarizing light is incident, in such a manner that a first predetermined angle is formed between the first polarizer and rubbing axes; and
   ii.) aligning second polarizer and rubbing axes of an upper plate, through which polarizing light passes via a liquid crystal, in such a manner that a second predetermined angle is formed between the second polarizer and rubbing axes;
   wherein the polarizer and rubbing axes are asymmetrically aligned to each other in such a manner that an angle formed between the first polarizer axis of the lower plate and the second polarizer axis of the upper plate is 90°±|the first predetermined angle −the second predetermined angle |.

2. The method as claimed in claim 1, wherein the first and second predetermined angles are less than an angle of 90°.

3. A fringe field switching liquid crystal display device comprised of:
   i.) a lower plate, said lower plate having first polarizer and rubbing axes and acting to polarize incident light, said lower plate having a first predetermined angle existing between the first polarizer and rubbing axes; and
   ii.) an upper plate, said upper plate having second polarizer and rubbing axes and acting to polarize light, said upper plate having a second predetermined angle existing between the second polarizer and rubbing axes;
   wherein the first and second polarizers and rubbing axes of said upper and lower plates are asymmetrically aligned to each other in such a manner that an angle is formed between the first polarizer axis of the lower plate and the second polarizer axis of the upper plate that is 90°±|the first predetermined angle−the second predetermined angle |.

4. The fringe field switching liquid crystal display device of claim 3, wherein the first and second predetermined angles are less than an angle of 90°.

* * * * *